United States Patent
Mohan et al.

(10) Patent No.: US 12,088,598 B2
(45) Date of Patent: Sep. 10, 2024

(54) SECURE ACCESS VIA A REMOTE BROWSER

(71) Applicant: Sonet.io, Inc., San Jose, CA (US)

(72) Inventors: Dharmendra Mohan, Sunnyvale, CA (US); Venu P. Banda, Cupertino, CA (US)

(73) Assignee: SONET.IO, INC., San Jose, CA (US)

( * ) Notice: Subject to any disclaimer, the term of this patent is extended or adjusted under 35 U.S.C. 154(b) by 0 days.

(21) Appl. No.: 18/318,595

(22) Filed: May 16, 2023

(65) Prior Publication Data

US 2023/0370472 A1 Nov. 16, 2023

Related U.S. Application Data

(60) Provisional application No. 63/342,626, filed on May 16, 2022.

(51) Int. Cl.
*H04L 9/40* (2022.01)

(52) U.S. Cl.
CPC .......... *H04L 63/105* (2013.01); *H04L 63/102* (2013.01)

(58) Field of Classification Search
CPC ............................ H04L 63/105; H04L 63/102
USPC ........................................................ 726/4
See application file for complete search history.

(56) References Cited

U.S. PATENT DOCUMENTS

| | | | | |
|---|---|---|---|---|
| 2009/0193451 | A1* | 7/2009 | O'Neil | H04L 61/4535 455/414.3 |
| 2015/0046790 | A1* | 2/2015 | Singh | G06F 40/169 715/234 |

OTHER PUBLICATIONS

Ericom Remote Browser Isolation, Retrieved at https://www.ericom.com/solutions/browser-isolation/, Retrieved on Apr. 2022, pp. 262.

* cited by examiner

*Primary Examiner* — Anthony D Brown
(74) *Attorney, Agent, or Firm* — Invoke

(57) ABSTRACT

Systems, methods, and computer-readable mediums are disclosed for preventing access to unauthorized content by users. A system performs operations, including receiving, from a remote browser, a set of information for generating a web page. The operations also include, based on the set of information, identifying content to be generated in the web page. The operations further include determining that a user associated with a local browser lacks permission to access a subset of the content. Additionally, the operations include, responsive to determining that the user lacks permission to access at least the subset of the content, generating a set of media instructions, such as text, audio, images, and video, excluding at least the subset of the content. Moreover, the operations include transmitting the set of media instructions to the local browser.

29 Claims, 12 Drawing Sheets

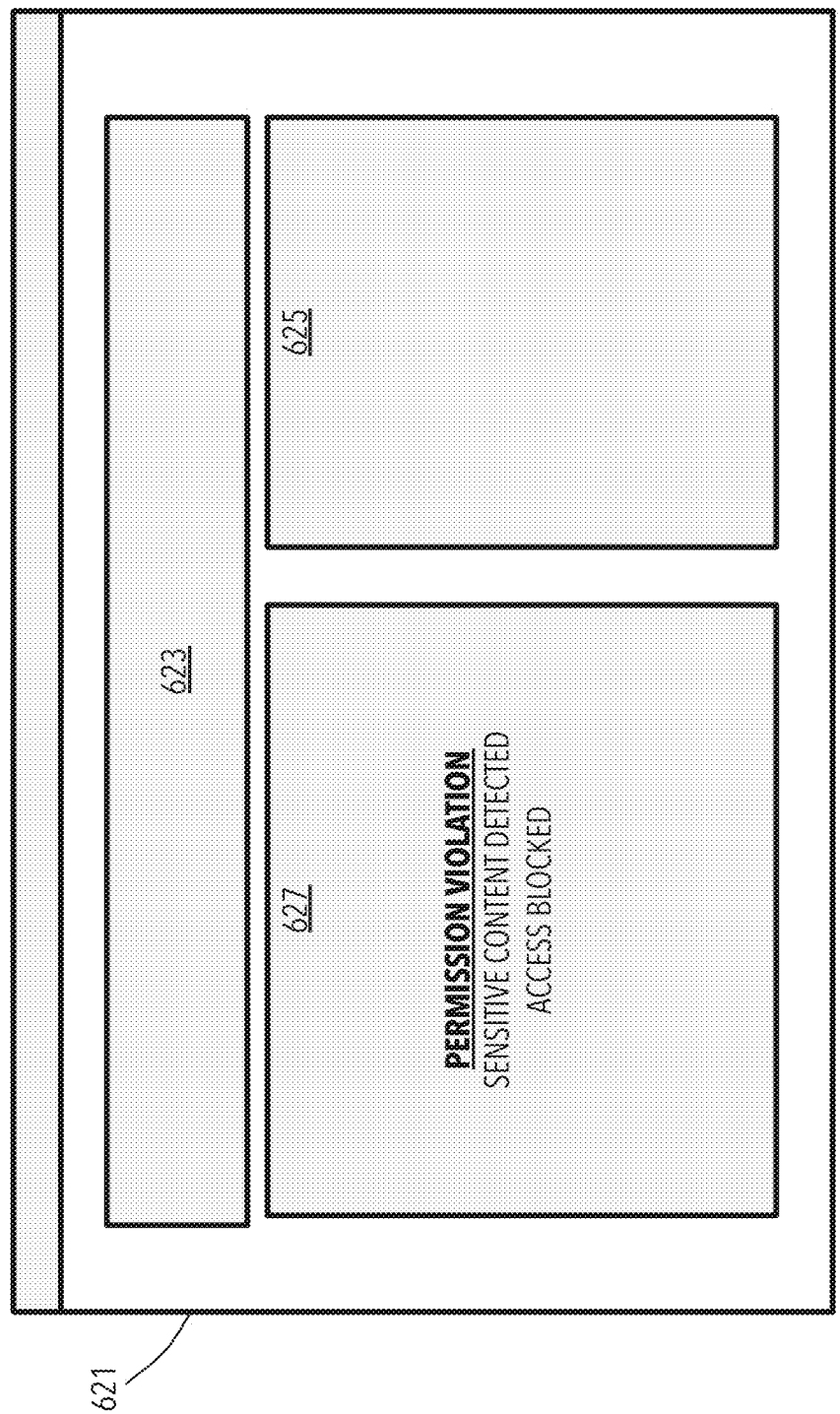

SECURE ACCESS VIA A REMOTE BROWSER

BENEFIT CLAIMS; RELATED APPLICATIONS; INCORPORATION BY REFERENCE

This application claims the benefit of U.S. Provisional Patent Application 63/342,626, filed May 16, 2022, which is hereby incorporated by reference in its entirety. The applicant hereby rescinds any disclaimer of claims scope in the parent application(s) or the prosecution history thereof and advise the USPTO that the claims in the application may be broader than any claim in the parent application(s).

TECHNICAL FIELD

The present invention relates generally to computer security, and more specifically to controlling access to computer-accessible content.

BACKGROUND

Online computer security solutions can protect users by restricting downloading of content that is dangerous, proprietary, confidential, illegal, or otherwise proscribed. For example, some computer security solutions prevent users from downloading and executing unpermitted information. In one such solution, "browser isolation" protects a user device from unpermitted information by remotely processing information at a secure system, rather than processing the information locally at a user device. By doing so, the user device is safely isolated from the unpermitted information. For example, a browser isolation solution may generate web pages using a browser at a remote server. The remote server executes code associated with the web page and produces a series of static images or video from the web page for display by a browser of the user device. Other browser isolation solutions use Document Object Model (DOM) mirroring in which DOMs corresponding to a web page are sanitized before being sent to the user device and reconstructed before generating a web page.

The approaches described in this section are ones that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. In the drawings:

FIGS. 6A, 6B, and 6C show pictures of example screens displayed by a system in accordance with one or more embodiments.

DETAILED DESCRIPTION

Figure 1:
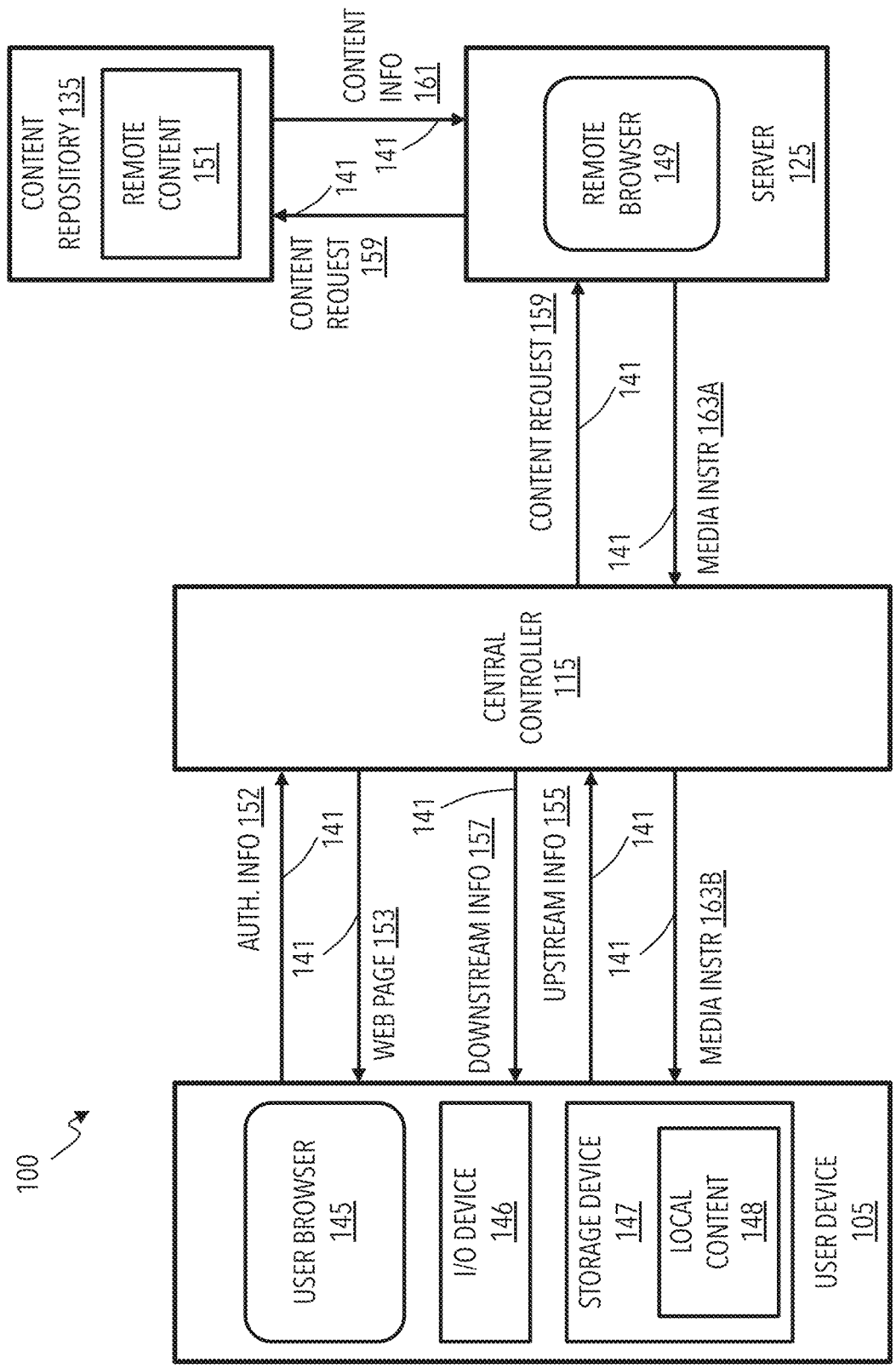
FIG. 1 shows a system block diagram illustrating an example of an environment for implementing systems and processes in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, conventional structures and devices are described with reference to a block diagram form in order to avoid unnecessarily obscuring the present disclosure.

1. GENERAL OVERVIEW
2. SYSTEM ARCHITECTURE
3. RESTRICTING AND MODIFYING CONTENT
4. EXAMPLE EMBODIMENT
5. HARDWARE OVERVIEW
6. MISCELLANEOUS; EXTENSIONS

1. General Overview

The present disclosure is directed towards computer security. More specifically, the present disclosure is directed to systems and methods providing secure access to information on remote computing systems by preventing exfiltration of protected information and accessing unpermitted information. One or more embodiments provide a computing system serving as a protective layer between end user devices and remote content sources. The protective layer enables the end users to interact with the remote computers while preventing downstream or upstream transmission of protected or unpermitted information. Additionally, the protective layer prevents upstream transmission of protected or unpermitted information (e.g., personally identifiable information, "PII") from end user devices. For example, the system can operate two browsers in tandem, wherein one browser is local and the other browser is remote, showing only one to the end user. All operations by the end user on the local browser (e.g., text, audio, mouse clicks, key strokes, and movements) are mimicked on the remote browser and the resulting display rendered from the remote to the local browser.

One or more embodiments enable end users to access and interact with the remote computers via the protective layer as if information at the remote computer were local. The protective layer can mimic upstream information (e.g., user inputs, browser selections, and data) transmitted from the end user device to remote computing system. The protective layer can also mimic downstream information (e.g., content) by translating and presenting the information at end user device. The system can mimic user's actions in the local browser on the remote browser and transmit the resulting output to the local browser. For example, the system can mimic a selection at a user browser on a browser of the remote computer and cause the remote browser to access the selected web page. Additionally, the system can mimic audio and video between the local and remote browsers.

One or more embodiments operate as a proxy that restricts or enhances information transmitted between the end user devices and the remote computer without any modifications to the original content retained by the source. Rules enforced at the proxy restrict access, modification and transmission of content. The rules can be statically or dynamically triggered based on one or more metrics, such as an application being accessed, and end user identity, end user behavior, and the like. Some embodiments maintain log of end user interactions with remote computers. The log can include potential permission violations, including events involving potential unpermitted content transmissions, metadata of the events (e.g., user identification, location, time, date, etc.) and audiovisual recordings (images or videos) of screens displayed at the end user devices.

One or more embodiments filter content transmitted between end-user devices and remote computers. For example, the system can determine whether an end user lacks permission to obtain some or all of the content requested from a content source. Based on predefined permissions, contextual limitations, the user's current context, (e.g., device, location, local time, behavior, and the like), and user inputs (e.g., mouse clicks), the system can limit or enhance downstream and upstream transmissions of content to/from the end user device. Some embodiments modify the content to exclude unpermitted portions. The modifications can include replacing unpermitted content or enhancing the content with different information (e.g., warnings, notifications, watermarks, etc.)

One or more embodiments modify the downstream content transmitted from the remote computers to the end user devices by determining media instructions for rendering the content. The system determines an initial set of media instructions usable for rendering the content received from a content source. The system analyzes the downstream content and generates media instructions to restrict or enhance the content that the end user is permitted to access. Alternatively, or additionally, the system may identify unpermitted portions of the downstream content, determine media instruction for rendering the downstream or upstream content excluding the unpermitted portions and enhance the downstream or upstream content with information (e.g., warnings or watermarks) before forwarding to end user device. Generating the media instructions for rendering the downstream content, without the unpermitted portions, may include modifying the media instructions The system transmits the modified media instructions (that render the downstream content without the unpermitted content portion) to the local computing device, instead of transmitting the entire content as received from the content source to the local computing device. Further, the remote computing device can transmit a notification to the local computing device indicating unauthorized portions have been removed and/or the unauthorized portions are not permitted for the user. One or more embodiments include the notification in the modified media instructions.

One or more embodiments monitor and control the upstream information transmitted from the end user devices. Upstream information can include user control inputs (e.g., mouse movements, mouse clicks, keystrokes, etc.), content (e.g., files), audio (e.g., sound from the local browser's mic output), output from other attached devices (e.g., USB, hardware authentication keys, etc.), and the like. The protective layer detects commands triggering actions, such as loading of a webpage, initiating transmission of content, triggering printing of content, and the like. Based on the target of the action, predefined permissions, contextual limitations, and the user's current context, the system can limit execution of the actions. For example, the system can detect and prevent uploading of restricted content, uploading of malware, manipulation of content (e.g., cut, copy, paste, keyboard inputs, audio inputs, etc.), and printing of content, including personally identifiable information.

In a non-limiting example, a user of a user device can attempt to access a web page via a local browser. The request for the web page is received at a central controller. As described above, the user inputs at the user browser can be mimicked at a remote browser based on control inputs to the user device. Using a remote browser, the central controller requests the web page from a content source and, in response, receives information for rendering the web page from the content source. The web page information can include layout, style, and content information for rendering the web page in a browser application. The remote browser can determine an initial set of media instructions that, when executed in the end user's local browser, render the same web page delivered by the content source to the remote browser. Subsequently, the central controller can generate modified media instructions that limit or enhance the content displayed at the end user's local browser. The content can be one or more of data, text, documents, audio, images, video, and combinations thereof. By analyzing the content based on user profiles, permissions, and contextual information, the central controller determines whether the user lacks permission to access any portion of the content. Responsive to determining that the user lacks permission to access a particular portion of the content, the central controller generates modified media instructions for rendering the web page excluding the unpermitted content. In some cases, the central controller replaces the unpermitted content with a notification indicating the content is forbidden to the user. Additionally or alternatively, the central controller can enhance the content with additional information, such as a watermark. The central controller transmits the modified media instructions to the user device, which renders the web page from the modified media instructions using a browser application. As the modified media instructions provide information for drawing a web page including only permitted content, the user device is prevented from receiving and exfiltrating unpermitted information.

One or more embodiments described in this Specification and/or recited in the claims may not be included in this General Overview section.

2. System Architecture

FIG. 1 shows a block diagram illustrating an example of an environment 100 for implementing systems and processes in accordance with aspects of the present disclosure. The environment 100 can include a user device 105, a central controller 115, a server 125, and one or more content repositories 135. The user device 105 can be a computing system that is communicatively connected, directly or indirectly, to the central controller 115, the server 125, and the content repository 135 via one or more communication channels 141. The communication channels 141 can include one or more wired or wireless data links and/or a communication networks, such as a local area networks, peer-to-peer networks, wide area networks, and the Internet.

The user device 105 can be a personal computer system, a smart phone, a tablet computer, a laptop computer, or other programmable user computing device. The user device 105 can include a user browser 145, one or more input/output (I/O) devices 146, and a storage device 147. The user browser 145 can be any web browser application that renders an interactive user interface (e.g., a graphic user interface) with which the user can interact. The I/O devices 146 can be devices through which the user can interact. The I/O devices 146 can include any device that enables the user to provide and/or receive information from the user device 105, such as a pointer device (e.g., a mouse), a keyboard, a touchscreen, an audio transducer (e.g., a microphone and speakers), portable storage device (e.g., a universal serial bus storage device), a hardware security key, a biometric reader device, or the like. The storage device 147 can include, for example, one or more flash drives and/or hard disk drives, which can store local content 148, which can be any type of information, such as documents, text, images, audio and video files, libraries, user data, etc.

The central controller 115 can include one or more server computers providing a protective layer that intercepts, processes, and relays information communicated between the user device 105, the server 125, and the content repository 135 through one or more of the communication channels 141. As discussed below, the central controller 115 can limit access to content sources, such as content repository 135, by a user of the user device 105. Additionally, the central controller 115 can selectively refrain from transmitting some or all of the content 151 communicated from the server 125 to the user device 105. Additionally, the central controller 115 can limit transmission of upstream information 155 (e.g., user inputs and local content 148) to the server 125.

The server 125 can be one or more computing devices that execute a remote browser 149 corresponding to the user browser 145. In some embodiments, the remote browser 149 and the user browser 145 mimic one another. The server 125 can be, for example, a web application provider, such as software-as-a-service (SaaS) platform. One or more embodiments of the server 125 receive a content request 159 from the central controller 115, relay the content request 159 to a content repository 135 identified in the content request 159, and receive content information 161, such as web page information, in response. The content request 159 can include a request to upload or download content. The remote browser 149 can process the content information 161 to detect and remove unpermitted information unpermitted content to sanitize the content information 161. For example, the remote browser 149 can be an isolated web browser application that executes the content information 161 in a sandboxed container and identifies unpermitted information or other security risks. Further, the remote browser 149 can determine media instructions 163A for rendering the content information 161 for display. The server 125 can transmit the media instructions 163A to the central controller 115 for analysis and provision to the user device 105.

The content repository 135 can be a computing system that distributes content, such as the content 151. The content repository 135 can host any type of web site or information repository. The content 151 can be any information provided by the forgoing types of web sites, including documents, text, images, audio, and video files, for example. Additionally, the content 151 can be mix of open, public, private, confidential, proprietary, and proscribed information.

In one or more example embodiments, a user of the user device 105 can interact with a user interface (e.g., a web page 153) provided by the central controller 115 via the user browser 145 and the I/O devices 146 to request and receive the content 151 from the content repository 135. The user can input information using one or more input techniques, including accessing information on a storage device, manually (e.g., using a keyboard and selection device), voice (e.g., using a microphone), visually (e.g., using gestures and eye-tracking), and the like. Additionally, via the I/O devices 146, the user interface can present information to the user visually, audibly, and/or tactilely. The interaction with the central controller 115 can include providing authentication information 152 to the central controller 115. The authentication information 152 can include login credentials, geolocation data, biometric information, and the like provided using an I/O device (e.g., a keyboard, finger print reader, retina scanner, etc.), cryptographic security key, or the like. Using the authentication information 152 and other contextual limitations (e.g., user behavior patterns), the central controller 115 can authenticate the identity and location of the user. Responsive to successful authentication, the central controller 115 can determine user profile information, including permissions, rules, authorizations, constraints, exclusions, and the like. For example, based on the user profile, the central controller 115 can determine that the user is permitted to access one or more content sources of a predetermined set of content sources, including the content repository 135.

The central controller 115 can provide the user device 105 an interactive web page 153 locally rendered by the user browser 145, which can present downstream information 157. The web page 153 can comprise a structured combination of user interface elements, such as hyperlinks, radio buttons, drop down menus, scroll bars, etc., via which the user browser 145 presents the downstream information 157 in an interactive display. In some embodiments, the web page 153 mimics a web page at the remote browser 149. The user can view and interact with graphic elements presented in the web page 153 to upstream information 155 using the I/O devices 146. The user browser 145 can communicate the upstream information 155 to the central controller 115. The upstream information 155 can include control information and media information. Control information represents actions that can be mimicked between the local and remote browser. For example, the control information can include user inputs, such as mouse clicks, key strokes, mouse movements, window resizing, pinching, zooming, and the like. Media information can include data files for upload/download, biometric information, security key data, etc.

In response to the upstream information 155 received from the user via the user device 105, the central controller 115 can transmit a content request 159 requesting remote content 151 from the content repository 135 using the remote browser 149. Some embodiments intercept the upstream information 155 to selectively block or limit transmission of the content request by applying appropriate policies or permissions. For example, the central controller 115 can prevent communication of confidential or personally identifiable information from the user device 105.

In response to the content request 159, the content repository 135 transmits content information 161 to the remote browser 149. The content information 161 can be, for example, audio, video, images, and/or text information for rendering a web page including the requested remote content 151. The content information 161 can include the remote content 151 directly or indirectly by reference to an external source. The remote browser 149 can process the content information 161 to detect and remove unpermitted information and other security threats. Also, using the content information 161, the remote browser 149 can determine media instructions 163A for generating the content information 161. The media instructions 163 sent to the user device 105 can, when executed by the user browser 145, render the corresponding web page, including audio, video, images, and/or text. For example, media instructions 163 could be graphical instructions such as DrawRect, DrawImage, DrawText at given coordinates, move cursor, etc.

The server 125 communicates the media instructions 163A, including the remote content 151, to the central controller 115, which analyzes the content 151 to determine whether the user is permitted to access some or all of the content 151. For example, the central controller 115 can determine whether or not the user is permitted to access the remote content 151 based on the user's profile information, permissions, and context. For example, the user profile information can define locations, time frames, device information, and behavioral patterns used to determine the user's permission to access to the remote content 151. Also, determining permission to access content by the user can be based on metadata describing the content's source, type, classification (e.g., classified, confidential, proprietary, and the like), subject matter, text, audio, and images. Permission to access the content can also be determined based on the content itself, including text data and image data included in the content. For example, the central controller 115 can identify unpermitted content using a machine learning model or a bag-of-words search of the remote content 151 and metadata of the remote content 151 to identify terms or combinations of terms included in the content. Additionally, one or more embodiments of the central controller can maintain a library of information identifying sources, types, classification, text, and images that are not permitted.

In response to determining that the user lacks permission to access a subset of the content 151, the central controller 115 can generate modified media instructions 163B and transmit the modified media instructions 163B to the user device 105 for display by the user browser 145. Modifying the media instructions 163A for rendering the content information 161 can include altering the media instructions 163A to remove elements corresponding to the unpermitted content. Additionally, modifying the media instructions 163A can include replacing the elements corresponding to the unpermitted content with modified content, such as instructions to display notification. Further, modifying the media instructions 463A can include adding content, such as by watermarking the content The user browser 145 can receive the modified media instructions 163B and generate the modified media instructions 163B such that the user device 105 displays the content 151 without a user viewing or accessing any unpermitted subsets of the content 151.

While the above example describes the central controller 115 analyzing and limiting downstream information 157 from the server 125 and the content repository 135, it is understood that the server 125 can also perform the same or similar operations for upstream information 155 from the user device 105. For example, the server can prevent upstream transmission of confidential, personal, or malicious information in the upstream information 155 from the user device 105. Additionally, while the central controller 115, the server 125, and the content repository 135 are illustrated in FIG. 1 as separate systems, it is understood that one or more embodiments can combine some or all of the functionality of the central controller 115, the server 125, and the content repository 135 into a single system or divide the functionality of the user device 105, the central controller 115, the server 125, and the content repository 135 among more systems. For example, one or more embodiments of the server 125 can include functionality of the content repository 135 and also store the content 151. Also, in one or more embodiments, a single system can include the functionality of the user device 105 and the central controller 115 and/or a single system can include the functionality the server 125 and the content repository 135. Further, one or more embodiments can maintain the content 151 in a system separate from the content repository 135.

Figure 2:
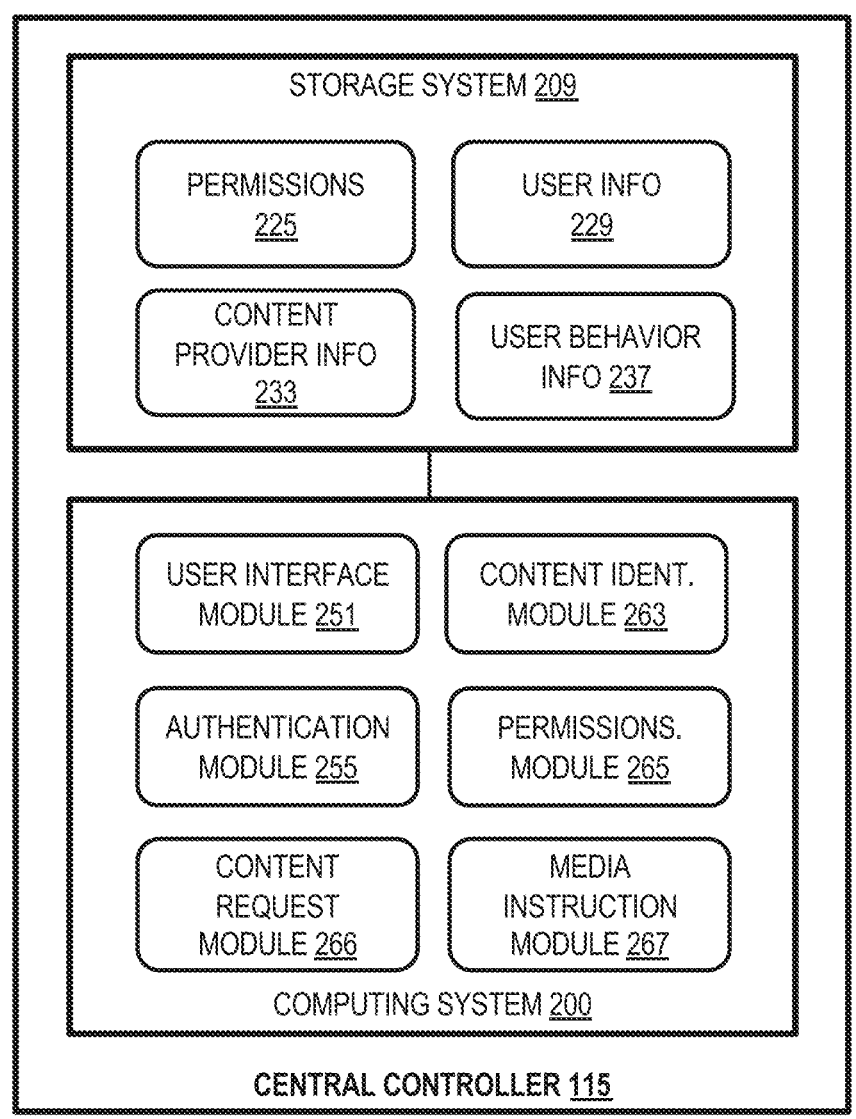
FIG. 2 shows a block diagram illustrating an example of a computing system in accordance with one or more embodiments.

FIG. 2 shows a system block diagram illustrating an example of a central controller 115, which can be the same or similar to that described above. The central controller 115 includes hardware and software that perform the processes and functions disclosed herein. One or more embodiments of the central controller 115 comprise a computing system that enables a user device (e.g., user device 105) to securely access and display content (e.g., content 151) from content sources (e.g., content repository 135) via a remote browser (e.g., remote browser 149 of server 125) by preventing transmission of unpermitted information to and from the user device.

In one or more embodiments, the central controller 115 includes a computing system 200 and a storage system 209. The computing system 200 includes one or more processors (e.g., microprocessor, microchip, or application-specific integrated circuit). The storage system 209 can comprise one or more computer-readable, non-volatile hardware storage devices that store information and program instructions used by the processes and functions disclosed herein. For example, the storage system 209 can include one or more flash drives and/or hard disk drives.

One or more embodiments of the storage system 209 store permissions 225, user information 229, content source information 233, and user behavior information 237. The permissions 225 can include authentications, roles, policies, and the like. The permissions 225 can apply to individual users, groups of users, or to all users. For example, the permissions 225 can apply to an individual employee, a class of employees, or all employees of an organization. The permissions 225 can also define devices, content sources, web sites (e.g., uniform resource locators (URLs)), and information that users and client devices are permitted to access or unpermitted to access. For example, the permissions 225 can apply to an individual device (e.g., a particular server), to individual content sources, classes of devices, and classes of content sources. Device-based permissions can correspond to, for example, a device identifier (e.g., universally unique identifier) and Internet protocol (IP) identifier (e.g., IP address) Further, the permissions 225 can define, for example, content-based role-based, time-based, and location-based restrictions on access to the devices, content sources, and information and information contained therein. Content-based permissions can define limitations on types of content, such as personal-identifiable information, confidential information, malware, or otherwise proscribed information. Time-based permissions can correspond to users' working hours, non-working hours, working days, non-working days, and the like. Location-based permissions can correspond to the users' employer locations, work site, residence, and the like. For instance, the permissions 225 can define different restrictions while the user is located at a place of employment using an employer-issued computer during working hours than while the user is located outside the place of employment during non-working hours using a personal computer.

The user information 229 can include information describing characteristics of individual users. The user information 229 can include, for example, individual users' identification information, biometric information, security level, employer, employment type, job type, employment location, residence information, working hours, and the like. By applying the permissions 225 to the user information 229, the central controller 115 can determine which devices, content, and information users are permitted to access in different contexts. For example, the central controller 115 can permit a software programmer to access different online services that an accountant based the users' different job functions.

The content source information 233 can include information describing particular content sources (e.g., content repository 135). For example, the content source information 233 can include a profile for content sources indicating type (e.g., public, private, business, government, social, blog, news, etc.), security information (e.g., confidential, proprietary, public, forbidden, compromised, etc.), location information, and type of information (e.g., type of content information). The content source information 233 can define a level of secure access the central controller 115 permits users to have when interacting with the content sources. For example, some content sources, such as streaming entertainment services, may lack limits on access. In such cases, the central controller 115 can allow content to pass to a client device with no restriction. Other content sources, such as confidential enterprise management systems, may be fully secure and block access by unauthorized users. In such cases, the central controller 115 can monitor, record, and analyze all upstream and downstream interactions, between the client device and the secure content source. It is understood that some implementations can have additional levels of secure access.

The user behavior information 237 can include profile information classifying particular end users' past activities. For example, the behavior information can classify the user's interaction patterns, such as login and access behavior, browsing behavior, data requested by the user, and data transmitted by the user. The interaction patterns can describe the user's past interactions with a content source. Based on the user behavior information 237, one or more embodiments can detect, identify, and limit anomalous behaviors that may indicate activities that deviate from interaction patterns with the content repository on the average. For example, user behavior information 237 can include metrics classifying a user's typical devices, locations, work hours, interactions, typing speed, application usage, content sources, quantities of information, applications usage, and sequences of actions. Using the user behavior information 237, the central controller 115 can determine whether a user's behavior is within one or more ranges of activity, such as normal activity, anomalous activity, and suspicious activity. Doing so can, for example, enable embodiments to detect malefactors from stealing data by impersonating authorized users.

Still referring to FIG. 2, the computing system 200 can execute a user interface module 251, an authentication module 255, a content identification module 263, a permissions module 265, a content request module 266, and a media instruction module 267. The user interface module 251 can be hardware, software, or a combination thereof that provides a user interface to a user at a user device (e.g., user device 105). One or more embodiments of the user interface module 251 can execute a remote user interface (e.g., web page 153) for the user via a browser application (e.g., user browser 145) at the user device. In some embodiments, the user interface module 251 mimics a user interface at the server (e.g., server 125) based on media instructions (e.g., media instructions 163) received from the server. Through the user interface, the central controller 115 can display at the user device a menu of online services, devices, content sources, content, and information for selection by the user. For example, the remote user interface can be a web page (e.g., a dashboard) corresponding to a particular employee or class of employees including hyperlinked icons or text to a selected set of productivity applications and websites. Additionally, the user interface module 251 can send/receive control inputs (e.g., upstream information 155) to/from the user interface. For example, the user interface module 251 can track and interpret user control inputs at the user device (e.g., keyboard entries and mouse clicks) corresponding to selections of the hyperlinked icons or text. Further, in response to receiving control inputs from the user device, the user interface module 251 can interpret the control inputs and generate contents requests (e.g., content request 159). For example, the control inputs can identify a hyperlink to content (e.g., content 151) at a content source (e.g., content repository 135), such as a web page.

The authentication module 255 can be hardware, software, or a combination thereof that receives and verifies user authentication information (e.g., authentication information 152) using the permissions 225, the user information 229, and the user behavior information 237. The authentication module 255 can verify the user's identity based on the authentication information and determine whether the user is permitted to access the central controller 115. Also, the authentication module 255 can determine a current context of the user and determine whether the user is authorized to access the central controller 115 in the current context. The current context may include, for example, the current time, the user device identifier, and the user device's location. Further, the authentication module 255 can determine whether the current context corresponds to the user's past behavior patterns by comparing the context to the user behavior information 237.

The content identification module 263 can be hardware, software, or a combination thereof that analyzes content information (e.g., content information 161) to identify content (e.g., 151). Content identification module 263 analyzes upstream information (e.g., content transmitted from an end user device 105 to the content repository 135) and downstream content (e.g., content transmitted from the content repository 135 to the end user device 105) to prevent communication of protected information, such as personally identifiable, confidential, sensitive or unpermitted data, and the like. The content identification module 263 can identify the content for analysis. For example, the content identification module can identify content included in the content information, as well as links or pointers to content, and store the identified content for analysis.

The permissions module 265 can be hardware, software, or a combination thereof that interprets content (e.g., content 151) and determines whether some or all of the content violates the permissions 225. The permissions module 265 can analyze the content based on user profiles, permissions (e.g. policies), and contextual information. Based on the analysis, the permission module 265 determines whether a user lacks permission to share or access any portion of the content. For example, the permissions module 265 can determine whether information is protected based on the source of the content, text of the content, and metadata of the content. The permissions module 265 can determine whether the content includes unpermitted information for an employee based on the employee's position, security clearance, and current context (e.g., time, location, device, and behavior). One or more embodiments can use artificial intelligence to determine whether content is forbidden to a certain user. For example, a machine learning model can be trained and applied to context information to classify a user's behaviors, such as location, time, and series of interactions, as inconsistent with the user's past behavior patterns.

In addition, the permissions module 265 can analyze upstream information (e.g., data input and control inputs) and, by applying appropriate policies or permissions, determine whether the upstream information should be blocked, limited, or permitted to proceed for further processing. Examples of control input include user interactions with I/O devices, such as mouse clicks. Examples of data input include content being uploaded in response to a control input. By doing so, the permission module 265 can limit the information uploaded to the content repository with regards to personally identifiable information and other impermissible content which would have liability implications.

The content request module 266 can be hardware, software, or a combination thereof that generates content requests (e.g., content request 159). The content request module 266 executed will remove, replace or add content identified by content identification module 263 and permissions module 265.

The media instruction module 267 can be hardware, software, or a combination thereof that generates media instructions (e.g., media instructions 165), which when executed by the user's browser will result in content 151 (with appropriate restrictions and enhancements) being displayed. For example, the media instruction module 267 can include code of a browser application that generates media instructions for rendering a web page. The media instruction module 267 generates instructions which when executed will remove, replace or add content identified by content identification module 263 and permissions module 265.

3. Restricting and Modifying Content

The flow diagrams in FIGS. 3A, 3B, 3C, and 3D illustrate examples of the functionality and operation of possible implementations of systems, methods, and computer program products according to various implementations consistent with the present disclosure. Each block in the flow diagrams of FIGS. 3A, 3B, 3C, and 3D can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 3A, 3B, 3C, and 3D. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIGS. 3A, 3B, 3C, and 3D show a process flow block diagram 300 illustrating an example of a process in accordance with one or more embodiments. At block 303, a system (e.g., central controller 115) receives user authentication information (e.g., authentication information 152) from a user device (e.g., user device 105). At block 311, the system can authenticate the user. For example, the system can authenticate the user by verifying the user identity and credentials. Also, the system can determine a current context for the access and whether the user is authorized to access the central controller 115 in the current context and determine whether the current context corresponds to the user's past behavior patterns based on, for example, permissions (e.g., permissions 225), user information (e.g., user information 229), and user behavior information (e.g., user behavior information 237). Additionally, the system can authenticate the user based on the location of the user device and the device profile (make, OS version, device type, etc.). The geolocation information can be determined by the user device based on, for example, global positioning system data. The geolocation information can also be estimated by the system based on an Internet Protocol address of the user device.

Figure 6A:
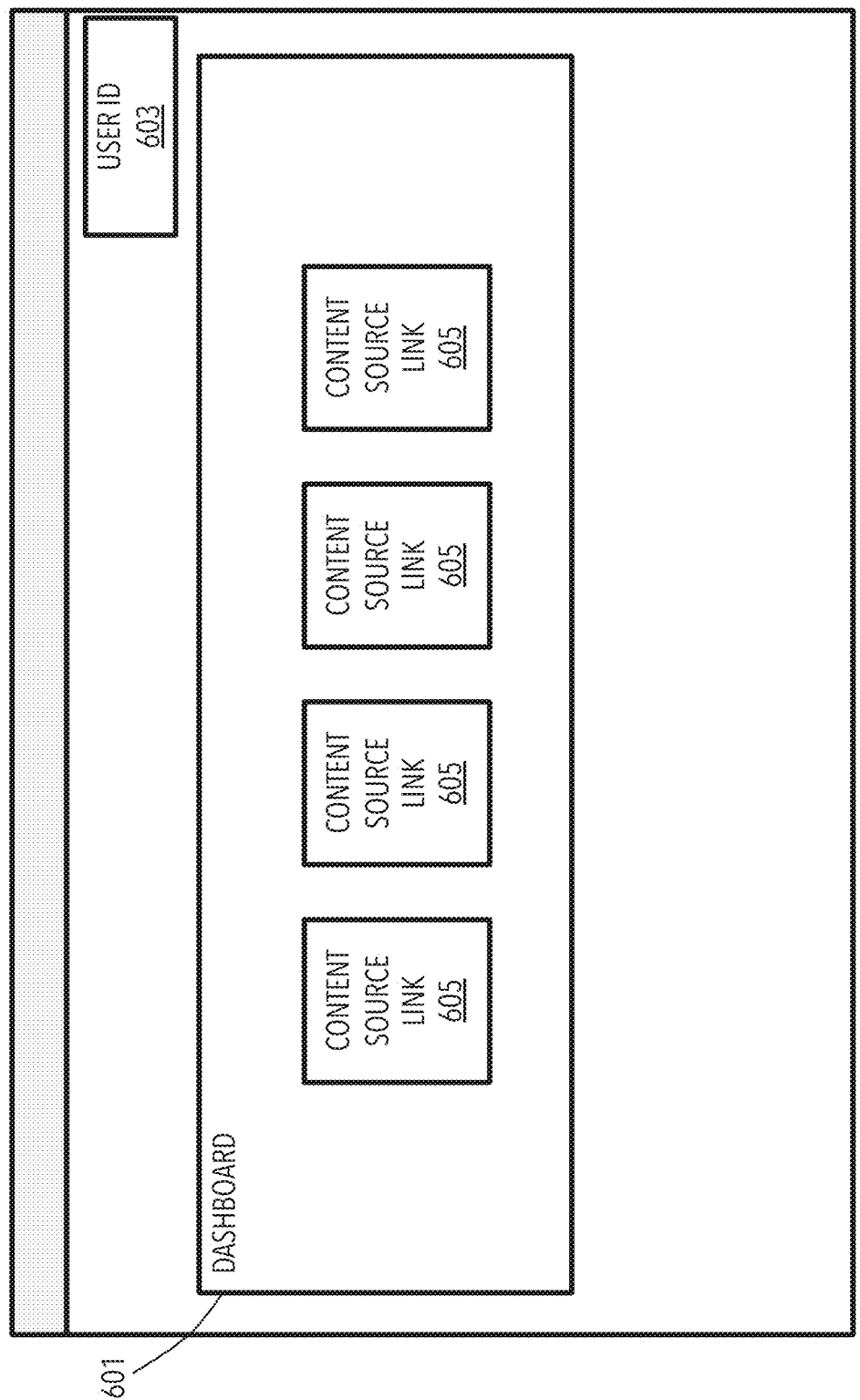

At block 315, responsive to successful authentication of the user at block 311, the system can transmit a dashboard (e.g., web page 153) to the user device. The dashboard can indicate information accessible through the system authorized for the particular user based on the authentication at block 311. One or more embodiments display the dashboard information using a browser application executed by the user device (e.g., user browser 145). FIG. 6A illustrates a picture of an example dashboard 601 for a particular user 603 including hyperlinked icons 605 to one or more authorized online service providers. The accessible information can include one or more sets of services, content sources, content, documents, and the like. The system can modify the sets of services, content sources, content, documents, and the like included in the dashboard based on the user's current context. For example, the icons 605 may vary depending on the user's location and work schedule. In one or more embodiments, the dashboard mimics a dashboard generated at a remote browser (e.g., remote browser 149) of a server (e.g., server 125).

At block 317, the system can receive one or more user inputs selecting content or a content source from the dashboard information displayed of user device at block 315. Receiving the selection can include receiving control information (e.g., via upstream information 155). For example, the user browser can receive user inputs, such as mouse clicks and keyboard entries, interacting with the dashboard. The user browser can transmit the control inputs indicating a selection of from the dashboard to the system. In one or more embodiments, the user inputs and operations of the user browser are mimicked by the remote browser of the server, as previously discussed above.

At block 318, the system can determine whether upstream information should be restricted (e.g., blocked or limited). As previously described, the system (e.g., executing permission module 265) analyze upstream information (e.g., data input and control inputs involved in the selection at block 317) using policies or permissions. The analysis can determine whether the upstream information should be blocked, restricted, or permitted. If the system determines the upstream information is not restricted (e.g., block 318 is "No"), the process 300 proceeds to block 319. On the other hand, if the system determines the upstream information is at least partially restricted (e.g., block 320 is "Yes,") then the process 300 proceeds to block 353 in FIG. 3C, as indicated by off-page connector "F."

At block 353, the system can analyze the upstream information to identify the unpermitted content. As previously described, the system can determine whether content is permitted based on user information, permissions, and behavior patterns. For example, the system can determine the user lacks permissions to accesses certain based on a user's job title, permissions corresponding to the job title. Also, the system can determine the user lacks permissions to access certain content based on the user's current context (e.g., time, location, device) being anomalous from their usual pattern of behavior for accessing the proprietary content from their work location during normal business hours. Further, the system can determine the certain types of content, such as confidential or personally-identifiable information, is restricted.

At block 355, the system can determine whether the user is permitted to upload a subset of the content based on the analysis at block 353. If not (e.g., block 355 is "No,") then at block 357 system can pass media instructions to transmit a notification to the user browser that upstream information is restricted or forbidden. Some embodiments may then return to block 319, as indicated by off-page connector "G." On the other hand, if the user is permitted to upload a subset of the content (e.g., block 355 is "Yes,"), then at block 358, the system can determine a modified content request redacting the forbidden subset and/or enhancing the content for which the user lacks permission. At block 359, the system can transmit the modified content request determined at block 358 and return to block 319, as indicted by off-page connector "G.

At block 319, the system mimics the user inputs received at block 317 in the user browser at the remote browser. For example, the user inputs can control the user browser to interact with the graphic user interface (GUI) element displayed by the locally rendered web page, such as opening a menu tab and selecting a hyperlink to content (e.g., content 151). The interactions with the GUI element at the local browser can be mimicked at the remote browser. In some embodiments, the local browser and remote browser substantially mirror one another by mimicking GUI elements, content, interactions, animations, and the like occurring in either browser throughout the process 300.

At block 320, the system can determine whether the user is permitted to access the content selected at block 317. For example, the system can determine whether the end user lacks permission to obtain some or all of the content requested from a content source. Based on a user's predefined permissions, contextual limitations, the user's current context, (e.g., device, location, local time, behavior, and the like), and user inputs (e.g., mouse clicks), the system can limits the content selected content. If not (e.g., block 320 is "No"), the process 300 proceeds to block 371, described below, as indicated by off-page connector "D." On the other hand, if the system determines the use is permitted to access the selected content (e.g., block 320 is "Yes,") then the process 300 proceeds to block 321.

At block 321, the system can request the content selected from the content source selected by the user at block 317. In some embodiments, as previously described at block 319, the remote browser can mimic the user inputs made at the local browser by mirroring the inputs (received, e.g., in upstream information 155). Additionally, the mimicking can include mirroring changes occurring at the local browser. In some other embodiments the system can transmit a content request (e.g., content request 159) received from the local browser though the remote. The remote browser can transmit the content request to the content source selected at block 317.

At block 323, the system can determine whether the content source is a controlled content source. If not, proceeding to FIG. 3C via off-page connector "A," then at block 363, the system can pass media instructions to transmit the requested content (e.g., text, audio, and/or video) from the selected content source to user browser without any modification. For example, the system can pass through commercial multimedia content from predefined entertainment providers. Some embodiments may then return to block 317, as indicated by off-page connector "E."

On the other hand, if the content source is a controlled source (e.g., block 323 is "Yes"), then at block 327, the system can receive media instructions (e.g., media instructions 163A) from the remote browser media instructions for representing the content (e.g., content information 161) including the content requested at block 321. The system can receive the media instructions from the remote browser, which can determine the media instructions using the content information 161 received from the content source. The media instructions can be information for generating the content information (e.g., content information 161) of a web page. For example, the content information can be a text document, such as a hypertext markup language (HTML) document encoded in a Unicode format (e.g., UTF-8).

Figure 3A:
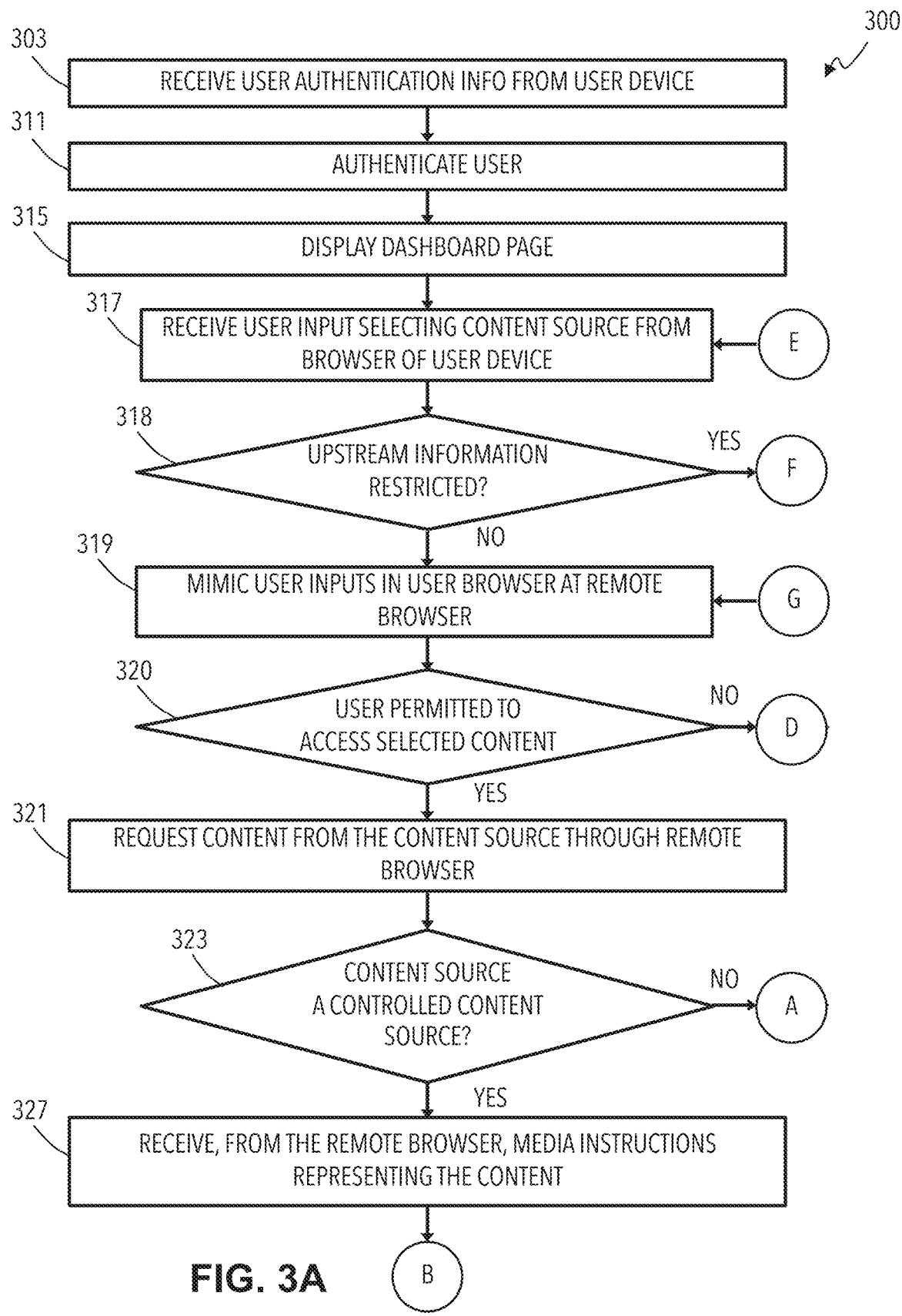
FIGS. 3A, 3B, 3C, and 3D show a process flow block diagram illustrating an example of a process in accordance with one or more embodiments.
Figure 3B:
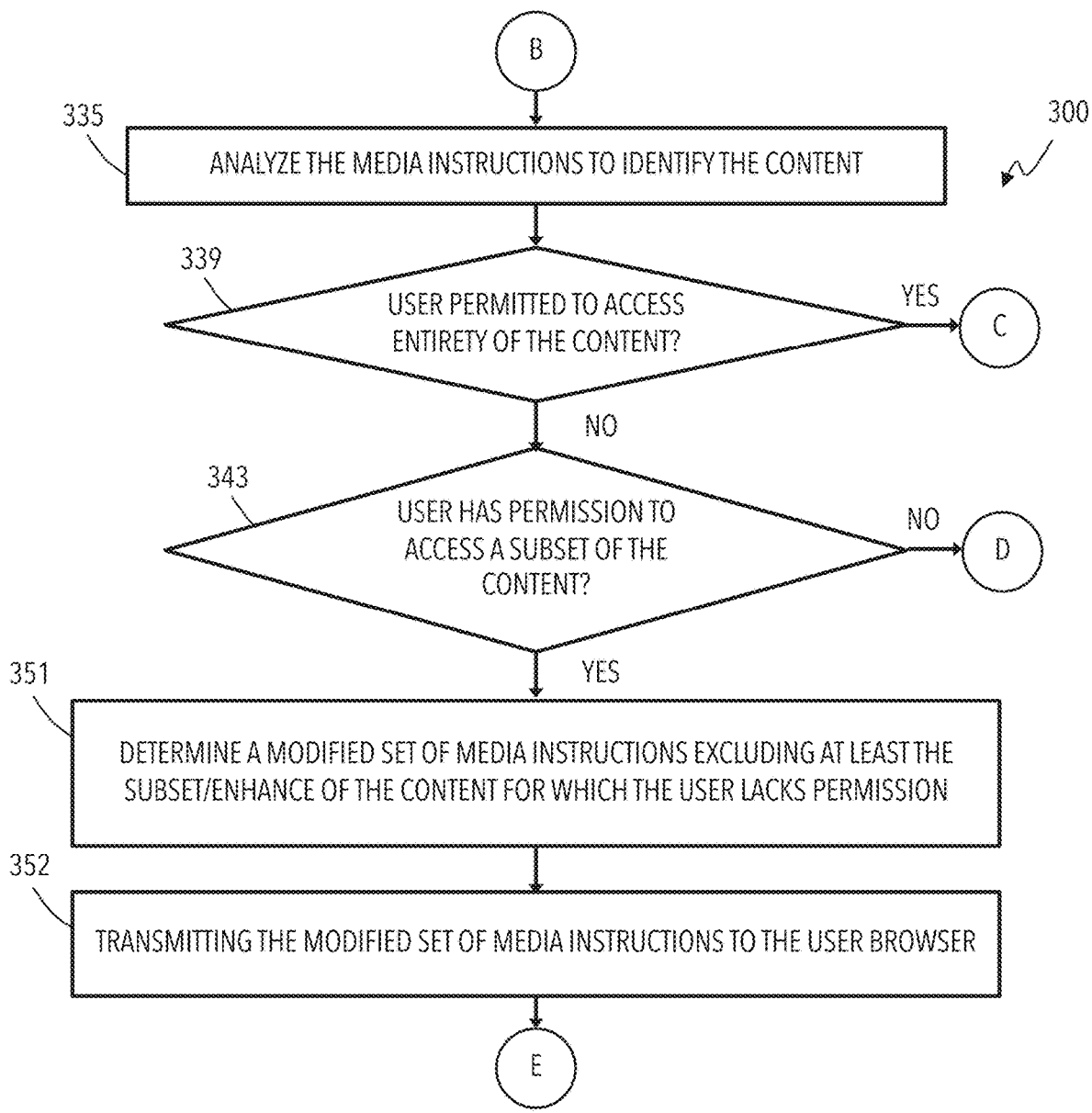
Figure 3C:
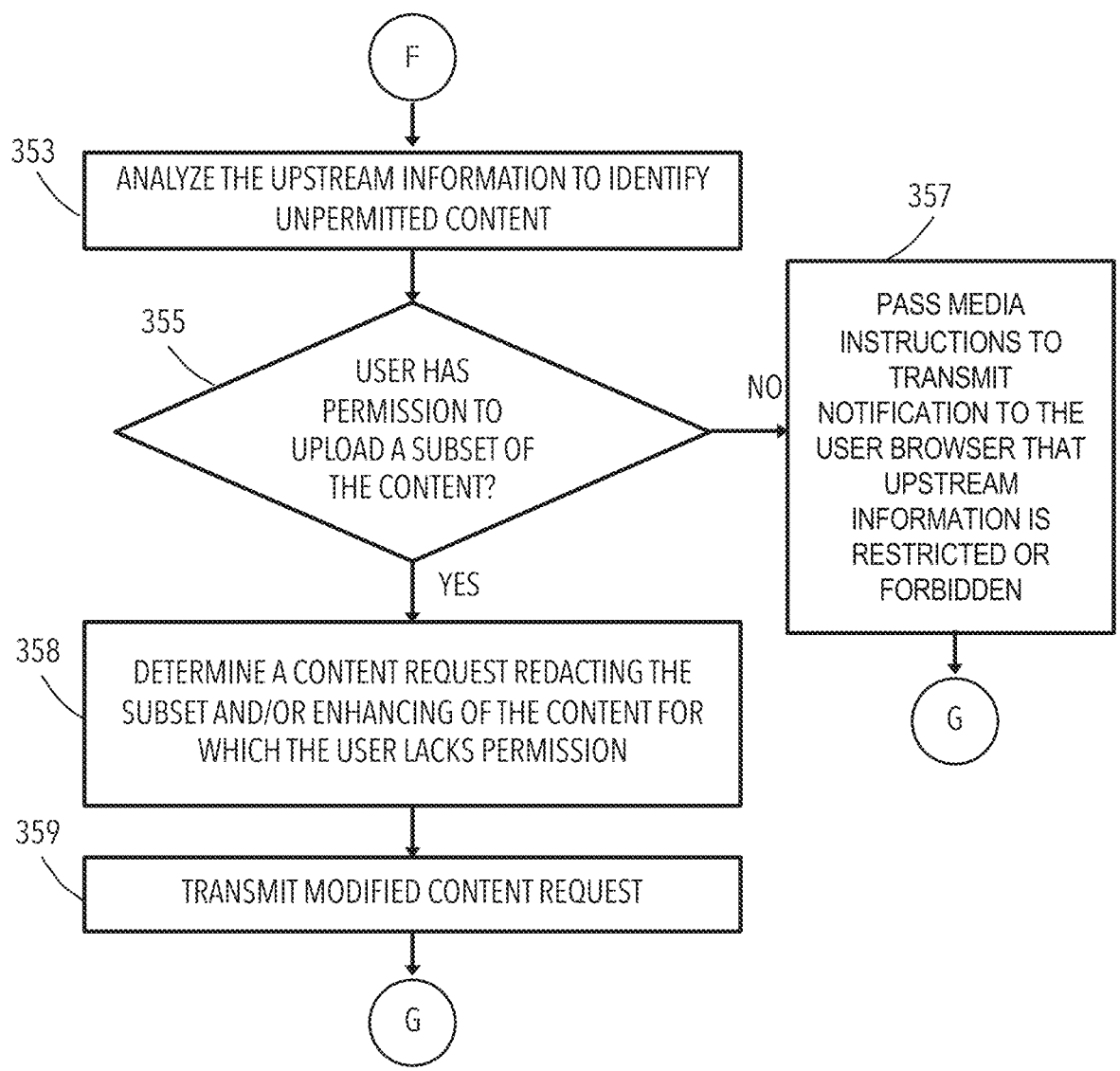
Figure 3D:
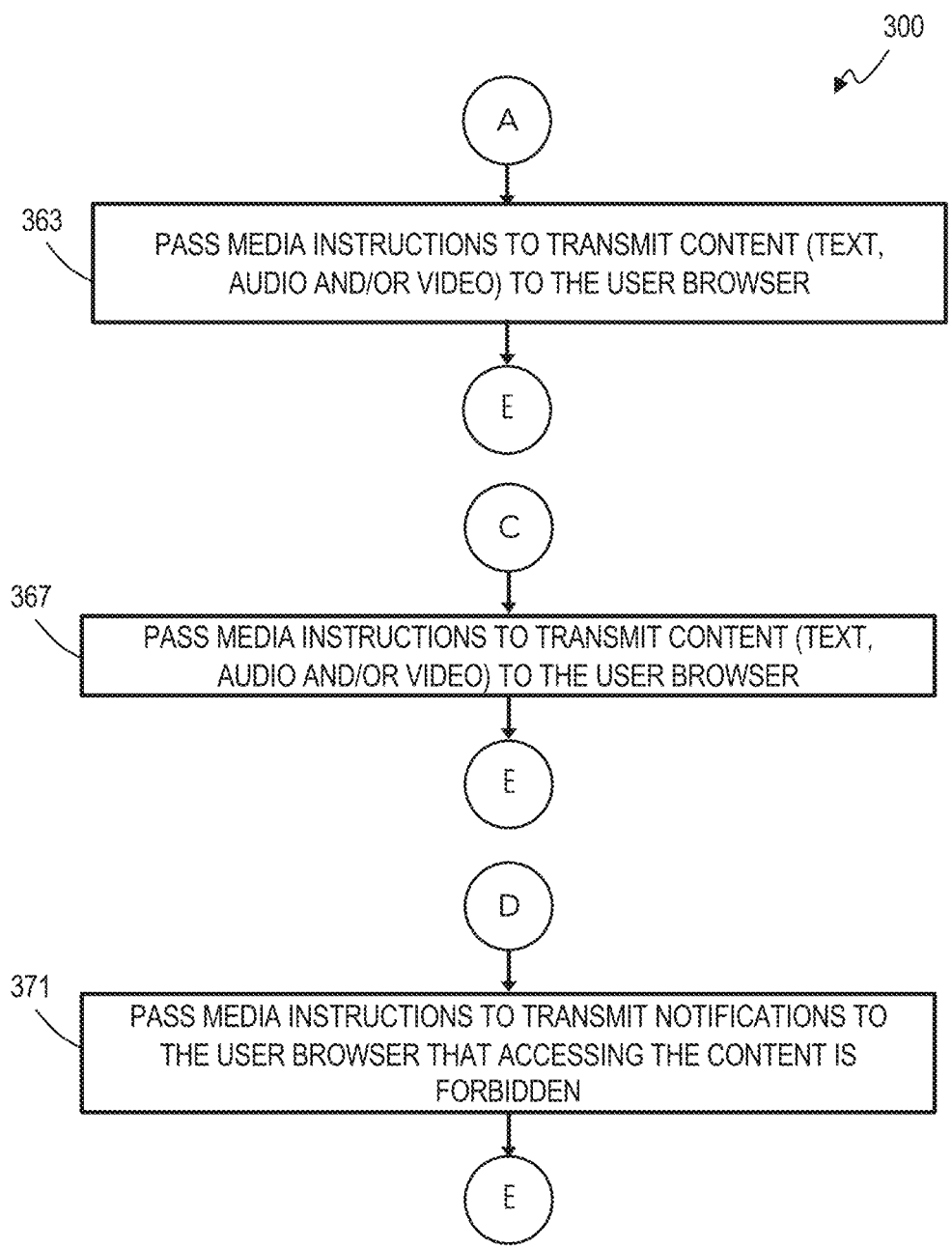

Continuing to FIG. 3B as indicated by off-page connector "B," at block 335 the system analyzes the media instructions received at block 327 to identify content included in the content information. At block 339, the system can determine whether the user is permitted to access an entirety of the content identified at block 335. As previously described, the system can determine whether content is permitted based on user information, permissions, and behavior patterns. For example, the system can determine the user lacks permissions to accesses the web page based on a user's job title, permissions corresponding to the job title. Also, the system can determine the user lacks permissions to access the web page based on the user's current context (e.g., time, location, device) being anomalous from their usual pattern of behavior for accessing the proprietary content from their work location during normal business hours. If the user is permitted to access the entirety of the content (e.g., block 339 is "Yes"), then continuing to FIG. 3C via off-page connector ("C"), then at block 367, the system can pass media instructions to transmit the content (e.g., text, audio, images, and/or video) received at block 323 to the user browser. Transmitting the content can include processing the content and sending unmodified media instructions for rendering by the user device. Some embodiments may then return to block 317, as indicated by off-page connector "E."

Figure 6B:
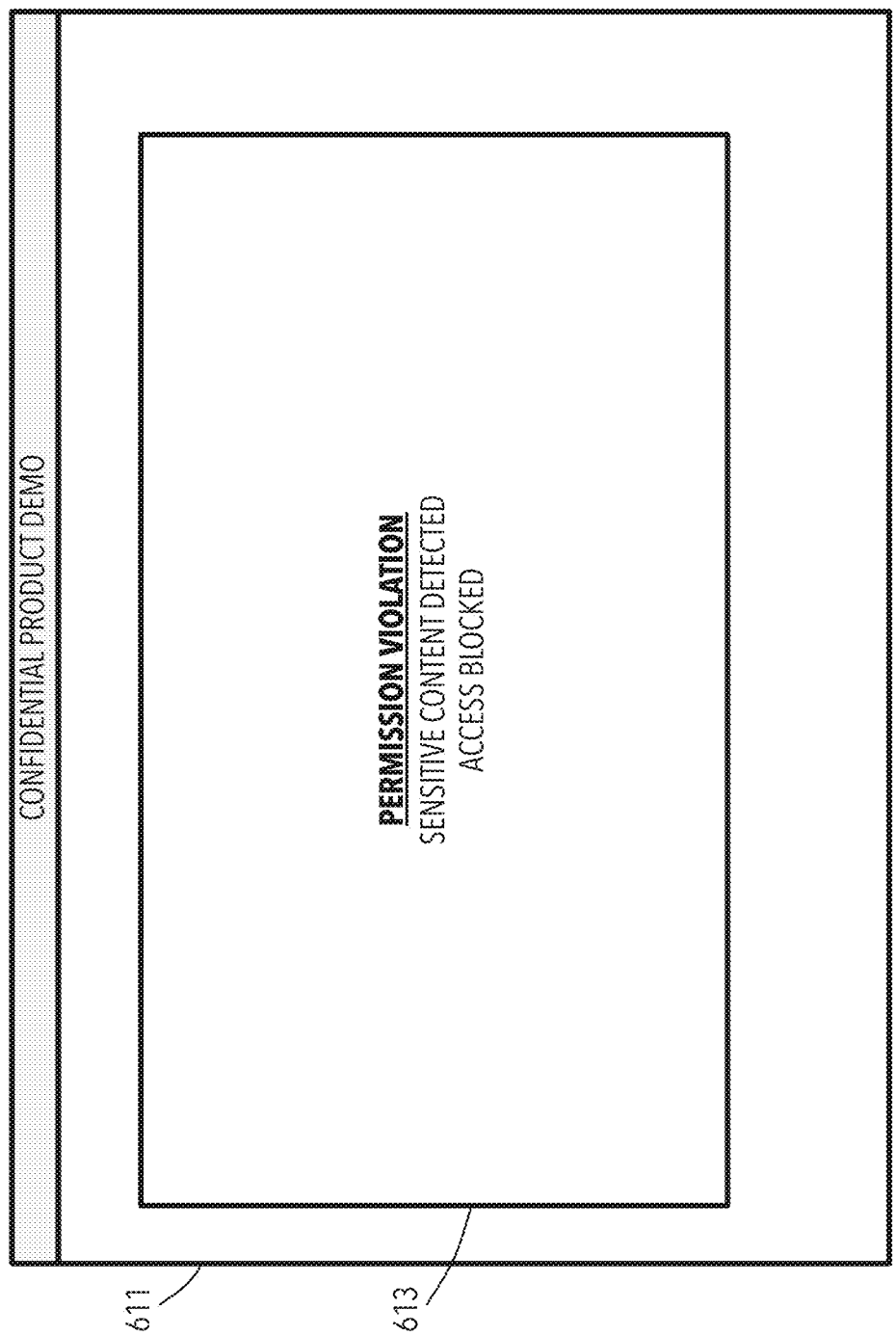

On the other hand, if the user is not permitted to access the entirety of the content (e.g., block 339 is "No"), then at block 343, the system can determine whether the user has permission to access at least a subset of the content. The system can identify the at least the subset of the first content for which the user lacks permission. For example, the system can determine the user lacks permission to access a subset of the content included in the web page that is highly confidential business information based on the permissions and the user's job title. Also, the system can determine the user lacks permission to accesses a subset of the content which is proprietary based on the user's current context (e.g., time, location, device) being anomalous from their usual pattern of behavior for accessing the proprietary content from their work location during normal business hours. If the user lacks permission to access any of the content (e.g., block 343 is "No"), then at block 371 in FIG. 3C, as indicated by off-page connector ("D"), the system can pass media instructions to transmit one or more notifications to the user browser that accessing the first content is forbidden. For example, FIG. 6B illustrates a picture of an example web page 611 transmitted to the user browser at block 371 including a notification 613 indicating that the requested content violates permissions, and the access is blocked to the user. Some embodiments may then return to block 317, as indicated by off-page connector "E."

On the other hand, if the user has permission to access a subset of the content (e.g., block 343 is "Yes"), at block 351, the system can determine a modified set of media instructions excluding the subset of the first content for which the user lacks permission. Modifying the media instructions can include replacing the subset of the content identified at block 343. In some implementations, modifying the media instructions removes the unpermitted content. In some other implementations, modifying the media instructions replaces the subset of content. For example, the system can replace the subset of the content with a notification, which indicates that the subset of the content is not permitted.

At block 352, the system can transmit the modified set of media instructions to the user browser. Using the modified media instructions, the user browser can render the web page requested by the user's selection at block 317. For example, FIG. 6C illustrates a picture of an example web page 621, including content 623, 625, and 627, transmitted to the user browser at block 371. Because of the media instructions determined at block 351 and the replacing of the subset of content, the content 627 has been replaced with a notification that the portion of the content requested at block 321 violates permissions and the access is blocked to the user.

While the above example describes the process 300 restricting content transmitted downstream from the remote browser to the user browser, it is understood that the process can also perform the same or similar operations for upstream information transmitted from the user browser to the remote browser. For example, the server can prevent upstream transmission of confidential, personal, or malicious information.

4. Example Embodiments

Figure 4:
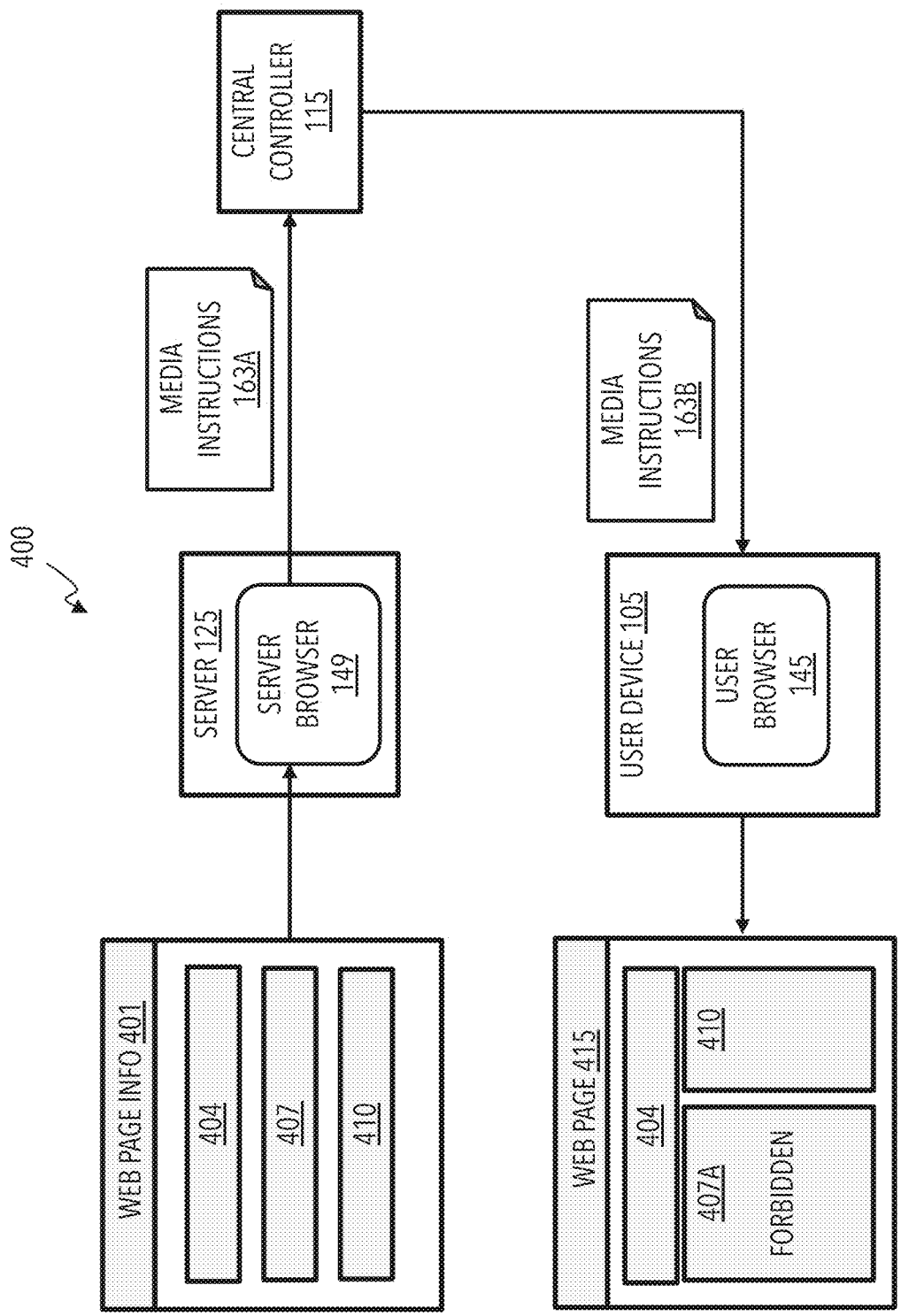
FIG. 4 shows a functional flow block diagram illustrating an example of a process in accordance with one or more embodiments.
Figure 5:
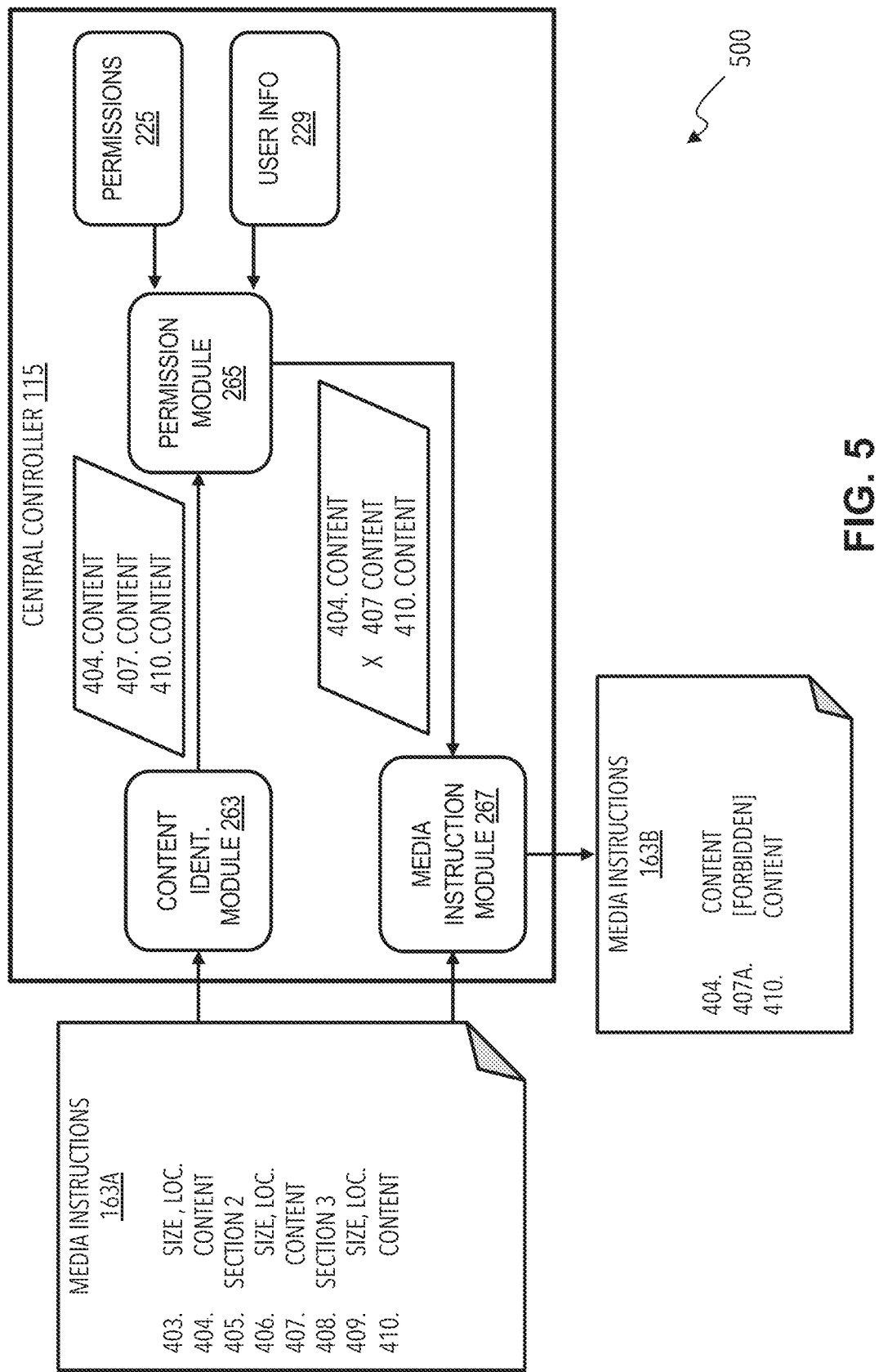
FIG. 5 shows a functional flow block diagram illustrating an example of a process in accordance with one or more embodiments.

FIGS. 4 and 5 illustrate examples for purposes of clarity. Components and/or operations described below should be understood as specific examples which may not be applicable to certain embodiments. Accordingly, components and/or operations described below should not be construed as limiting the scope of any of the claims.

FIG. 4 shows a functional flow block diagram 400 illustrating an example of a process for transmitting requested content in accordance with one or more embodiments. The flow block diagram 400 includes user device 105, central controller 115, server 125, user browser 145, and remote browser 149, all of which can be the same or similar to those described previously above. The remote browser 149 receives web page information 401 (e.g., content information 161), including content 404, 407, and 410, from a content source (e.g., content repository 135). The remote browser 149 can sanitize the web page information 401 to identify and remove unpermitted information or other security threats. Additionally, the remote browser 149 can determine media instructions 163A for rendering the web page information 401 into a web page and forward the media instructions 163A to the central controller 115.

The central controller 115 receives the media instructions 163A to identify the content 404, 407, and 410. The central controller 115 can also determine whether the user lacks permission to access any subset of the content 404, 407, and 410 included in the media instructions 163A. Based on a determination that the user lacks permission to access content 407, the central controller 115 can refrain from transmitting content 407 to the user device 105. Using the information included in the media instructions 163A, the central controller 115 renders modified media instructions 163B, including the content 404 and 410, while excluding the unpermitted content 407. Additionally, when modifying the media instructions the central controller 115 can replace the unpermitted content 407 with content 407A, including a notification that the content 407 is forbidden and blocked to the user.

FIG. 5 shows functional flow block diagram illustrating example of a processes performed by the central controller 115 in accordance with one or more embodiments. The central controller 115 can include a content identification module 263, a permission module 265, and a media instruction module 267. The content identification module 263, the permission module 265, and the media instruction module 267 can be the same or similar to those previously described above. As illustrated in FIG. 5, the content identification module 263 can receive media instructions 163A. The media instructions 163A can be a structured data file for rendering a web page (e.g., web page 415), including content 404, 407, and 410. The content 404, 407A, and 410 can contain, for example, text, program code, documents, advertisements, images, video, audio, music, data files, and hyperlinks to such information. The content identification module 263 can process the media instructions 163A to identify and process the content 404, 407, and 410, and provide the content to the permissions module 265. For example, the content identification module 263 can render a web page based on the media instructions 163A and scrape the web page for the content 404, 407, and 410. Scraping the web page can include using one or more optical character recognition (OCR) modules, image recognition modules, voice recognition modules, and the like to translate the content 404, 407, and 410 into computer-readable formats.

The permissions module 265 can interpret and analyze the content for violations using, permissions 225 and user information 229. As shown in FIG. 5, the permissions module 265 can identify restricted content 407 as violating the permissions 225 (as indicated by the "X"); whereas content 404 and 410 do not violate permissions. Based on the output of the permission module 265, the media instruction module 267 can generate modified media instructions 163B, including content 404 and 410 and excluding content 407. As described above, the media instruction module 267 can generate the modified media instructions 163B by including content 407A in replacement of content 407, which indicates that content 407 is unpermitted and blocked to the user. For example, the permissions 225 can include policy that any document containing social security numbers should not be downloaded. By applying this policy to the content 404, 407, 410, the permissions module 265 can determine that content 407 includes social security numbers in violation of this policy, whereas content of content elements 404 and 410 do not include social security numbers. Based on the determination made by the permission module, the media instruction module 267 can generate the modified media instructions 163B excluding the content 407 and, in one or more embodiments, replacing the content 407 with different content 407A, such as a notification. Thus, the central controller 115 can prevent an end user's attempt to download a document (e.g., web page 401), or portions thereof, including social security numbers.

It is understood that other examples can perform similar operations to those above when processing information, content, and user inputs transmitted from a local browser. For example, based on the output of the permission module 265, the central controller 115 (e.g., executing content request module 266) can generate modified contents requests (e.g., content requests 159) from upstream information from a user device (e.g., upstream information 155 generated by user browser 145 of user device 145). The central controller 115 can generate the modified content requests redacting unpermitted information. For example, the permissions 225 can include a policy that any document containing social security numbers should not be uploaded. By applying this policy to the content request, the permissions module 265 can determine that the upstream information includes social security numbers in violation of this policy and cause the central controller 115 can generate the modified content request redacting the unpermitted information. Additionally, the content request module 266 can modify or enhance the unpermitted information to, for example, indicate the redaction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
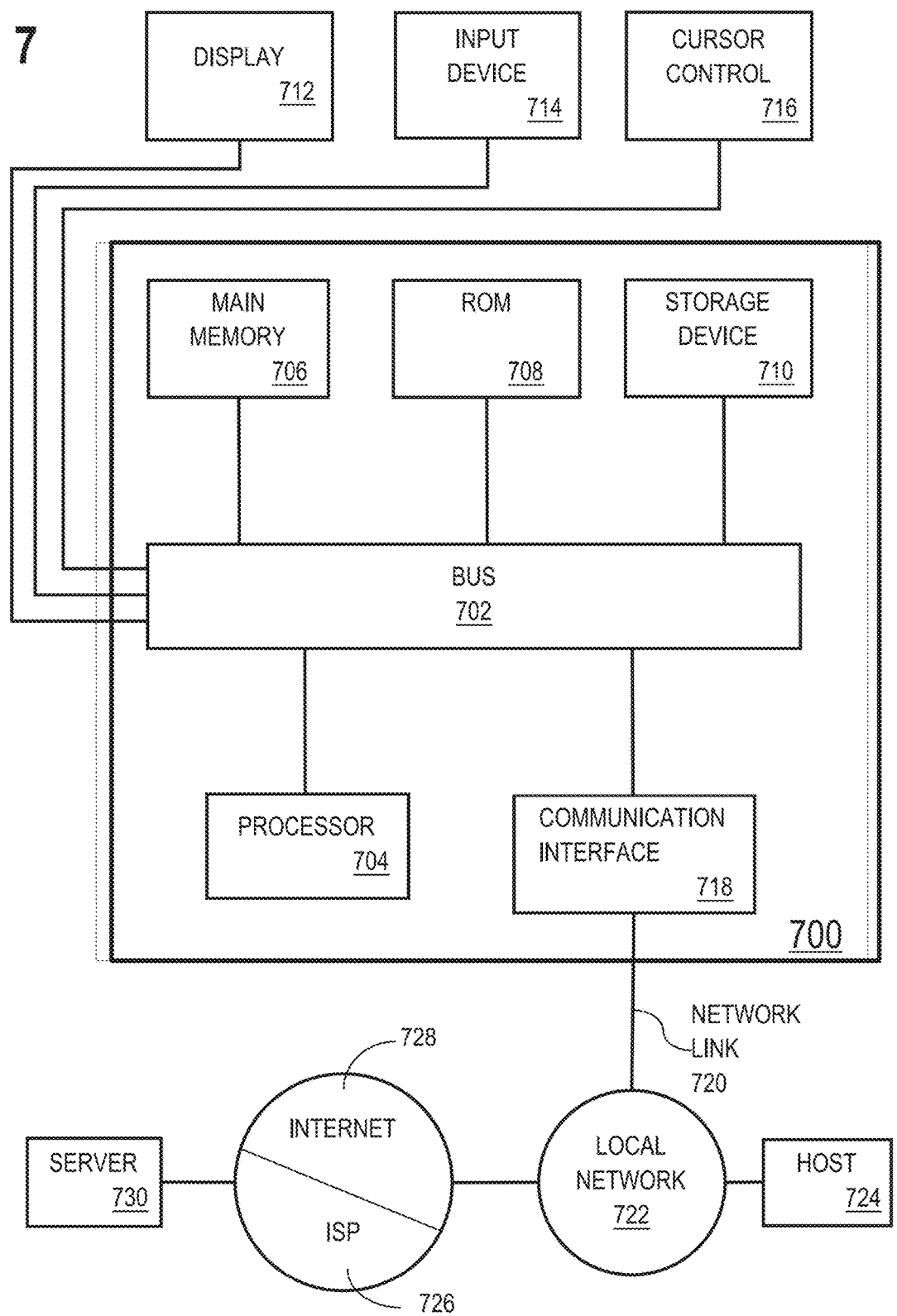
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

6. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A non-transitory computer readable medium comprising instructions which, when executed by one or more hardware processors, causes performance of operations comprising:
   receiving, from a first browser, a first set of information for generating a first web page;
   based on the first set of information, identifying content to be presented in the first web page;
   determining, for a user associated with a second browser, permissions to access at least a subset of the content;

responsive to determining that the user lacks the permissions to access at least the subset of the content, generating a first set of media instructions to generate the first web page without the subset of the content; and
transmitting the first set of media instructions to the second browser.

2. The medium of claim 1, wherein:
determining the permissions comprises determining that a user associated with a second browser, lacks permission to access at least a subset of the content; and
generating the media instructions comprises, responsive to determining that the user lacks permission to access at least the subset of the content, generating the first set of media instructions by excluding at least the subset of the content.

3. The medium of claim 1, wherein the operations further comprise, prior to receiving the first set of media instructions from a first browser:
receiving, by the first browser, an initial set of media instructions including the content to be generated on the first web page; and
generating, by the first browser, the first set of media instructions for generating the first web page with the content.

4. The medium of claim 3, wherein the operations further comprise:
generating the first web page based on the initial set of media instructions; and
scraping the first web page for the content.

5. The medium of claim 2, wherein, responsive to determining that the user lacks permission to access at least the subset of the content, the operations further comprise:
transmitting a notification to the second browser that accessing at least the subset of the content is forbidden.

6. The medium of claim 1, wherein the operations further comprise:
receiving, from the first browser, a second set of information for generating a second web page;
determining that the user, associated with a second browser, possesses permission to access an entirety of the content to be generated on the second web page based on the second set of information; and
responsive to determining that the user possesses permission to access the entirety of the content to be generated on the second web page, transmitting a second set of media instructions to the second browser.

7. The medium of claim 1, wherein:
a server executes the first browser;
a user device of the user executes the second browser; and
the operations further comprise transmitting, by the user device to the server via a communication channel, a content request from the user.

8. The medium of claim 1, wherein:
a web application supplies the content;
a client device used by the user executes the second browser; and
an intermediate device on a communication channel between the web application and the client device executes the operations.

9. The medium of claim 1, wherein determining that the permissions to access at least the subset of the content is based on one or more of: permissions of the user, behaviors of the user, context of a user device, and anomalous pattern associated with data transmitted.

10. A method comprising:
receiving, from a first browser, a first set of information for generating a first web page;
based on the first set of information, identifying content to be generated in the first web page;
determining, for a user associated with a second browser, permissions to access at least a subset of the content;
responsive to determining that the user lacks the permissions to access at least the subset of the content, generating a first set of media instructions to generate the first web page without the subset of the content; and
transmitting the first set of media instructions to the second browser, wherein the method is performed by at least one device comprising a hardware computer processor.

11. The method of claim 10, wherein:
determining the permissions comprises determining that a user associated with a second browser, lacks permission to access at least a subset of the content; and
generating the media instructions comprises, responsive to determining that the user lacks permission to access at least the subset of the content, generating the first set of media instructions by excluding at least the subset of the content.

12. The method of claim 10, further comprising, prior to receiving the first set of media instructions from a first browser:
receiving, by the first browser, an initial set of media instructions including the content to be generated on the first web page; and
generating, by the first browser, the first set of media instructions for generating the first web page with the content.

13. The method of claim 12, further comprising:
generating the first web page based on the initial set of media instructions; and
scraping the first web page for the content.

14. The method of claim 11, wherein, responsive to determining that the user lacks permission to access at least the subset of the content, the method further comprises:
transmitting a notification to the second browser that accessing at least the subset of the content is forbidden.

15. The method of claim 10, further comprising:
receiving, from the first browser, a second set of information for generating a second web page;
determining that the user, associated with a second browser, possesses permission to access an entirety of the content to be generated on the second web page based on the second set of information; and
responsive to determining that the user possesses permission to access the entirety of the content to be generated on the second web page, transmitting a second set of media instructions to the second browser.

16. The method of claim 10, wherein:
a server executes the first browser;
a user device of the user executes the second browser; and
further comprising transmitting, by the user device to the server via a communication channel, a content request from the user.

17. The method of claim 10, wherein:
a web application supplies the content;
a client device used by the user executes the second browser; and
an intermediate device on a communication channel between the web application and the client device executes the method.

18. The method of claim 10, wherein determining the permissions to access at least the subset of the content is based on one or more of: permissions of the user, behaviors of the user, context of a user device, and anomalous pattern associated with data transmitted.

19. A system comprising one or more hardware processors and a non-transitory computer readable medium storing program instructions that, when executed by the one or more hardware processors, causes performance of operations comprising:
receiving, from a first browser, a first set of information for generating a first web page;
based on the first set of information, identifying content to be generated in the first web page;
determining, for a user associated with a second browser, permissions to access at least a subset of the content;
responsive to determining that the user lacks the permissions to access at least the subset of the content, generating a first set of media instructions to generate the first web page without the subset of the content; and
transmitting the first set of media instructions to the second browser.

20. The system of claim 19, wherein:
determining the permissions comprises determining that a user associated with a second browser, lacks permission to access at least a subset of the content; and
generating the media instructions comprises, responsive to determining that the user lacks permission to access at least the subset of the content, generating the first set of media instructions by excluding at least the subset of the content.

21. The system of claim 19, wherein the operations further comprise, prior to receiving the first set of media instructions from a first browser:
receiving, by the first browser, an initial set of media instructions including the content to be generated on the first web page; and
generating, by the first browser, the first set of media instructions for generating the first web page with the content.

22. The system of claim 21, wherein the operations further comprise:
generating the first web page based on the initial set of media instructions; and
scraping the first web page for the content.

23. The system of claim 20, wherein, responsive to determining that the user lacks permission to access at least the subset of the content, the operations further comprise:
transmitting a notification to the second browser that accessing at least the subset of the content is forbidden.

24. The system of claim 19, wherein the operations further comprise:
receiving, from the first browser, a second set of information for generating a second web page;
determining that the user, associated with a second browser, possesses permission to access an entirety of the content to be generated on the second web page based on the second set of information; and
responsive to determining that the user possesses permission to access the entirety of the content to be generated on the second web page, transmitting a second set of media instructions to the second browser.

25. The system of claim 19, wherein:
a server executes the first browser;
a user device of the user executes the second browser; and
the operations further comprise transmitting, by the user device to the server via a communication channel, a content request from the user.

26. The system of claim 19, wherein:
a web application supplies the content;
a client device used by the user executes the second browser; and
an intermediate device on a communication channel between the web application and the client device executes the operations.

27. The system of claim 19, wherein determining the permissions to access at least the subset of the content is based on one or more of: permissions of the user, behaviors of the user, context of a user device, and anomalous pattern associated with data transmitted.

28. The medium of claim 1, wherein the first set of information, for generating the first web page, is generated by the first browser in a web page rendering process.

29. The medium of claim 1, wherein modifying at least the subset of the content comprises removing at least a portion of the subset of content.

* * * * *